US012608015B2

(12) United States Patent
Ikeda et al.

(10) Patent No.: US 12,608,015 B2
(45) Date of Patent: Apr. 21, 2026

(54) CONTROL DEVICE

(71) Applicant: TOYOTA JIDOSHA KABUSHIKI KAISHA, Toyota (JP)

(72) Inventors: Keigo Ikeda, Nisshin (JP); Yasuhiro Saito, Toyoake (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/603,514

(22) Filed: Mar. 13, 2024

(65) Prior Publication Data

US 2024/0402722 A1 Dec. 5, 2024

(30) Foreign Application Priority Data

May 31, 2023 (JP) ................................. 2023-089444
Oct. 30, 2023 (JP) ................................. 2023-185261

(51) Int. Cl.
*G05D 1/243* (2024.01)
*B62D 65/18* (2006.01)
*G05D 1/249* (2024.01)
*G05D 101/00* (2024.01)
*G05D 107/70* (2024.01)

(52) U.S. Cl.
CPC ........... *G05D 1/2435* (2024.01); *G05D 1/249* (2024.01); *B62D 65/18* (2013.01); *G05D 2101/22* (2024.01); *G05D 2107/70* (2024.01)

(58) Field of Classification Search
CPC ...... G01D 1/2435; G01D 1/249; G01D 1/225; G01D 2101/22; G01D 2107/70; G01D 2105/22; G01D 2109/10; B62D 65/18; G05B 19/0423; G05B 2219/25257
See application file for complete search history.

(56) References Cited

U.S. PATENT DOCUMENTS

| | | | |
|---|---|---|---|
| 2010/0017407 A1 | 1/2010 | Beniyama et al. | |
| 2017/0320529 A1 | 11/2017 | Nordbruch | |
| 2021/0229680 A1 | 7/2021 | Chakravarty et al. | |
| 2021/0394747 A1 | 12/2021 | Li et al. | |
| 2022/0187448 A1* | 6/2022 | Shand | G01S 13/931 |
| 2023/0367330 A1 | 11/2023 | Morinaga et al. | |

FOREIGN PATENT DOCUMENTS

| | | | |
|---|---|---|---|
| JP | 2010-023950 A | | 2/2010 |
| JP | 2017-538619 A | | 12/2017 |
| JP | 2022-515809 A | | 2/2022 |
| JP | 2022076876 A | * | 5/2022 |
| JP | 2023-20478 A | | 2/2023 |
| WO | 2022/075083 A1 | | 4/2022 |

* cited by examiner

*Primary Examiner* — Michael J Zanelli
(74) *Attorney, Agent, or Firm* — Oliff PLC

(57) ABSTRACT

A control device is configured to generate a control command for controlling a movable body, using three-dimensional point cloud data about the movable body that is measured using a distance measurement device, the control device including: a range specification unit configured to specify a use range that is a range including only some of the three-dimensional point cloud data; and an estimation unit configured to estimate at least one of the position and orientation of the movable body, using the three-dimensional point cloud data in the use range.

5 Claims, 6 Drawing Sheets

FIG. 3

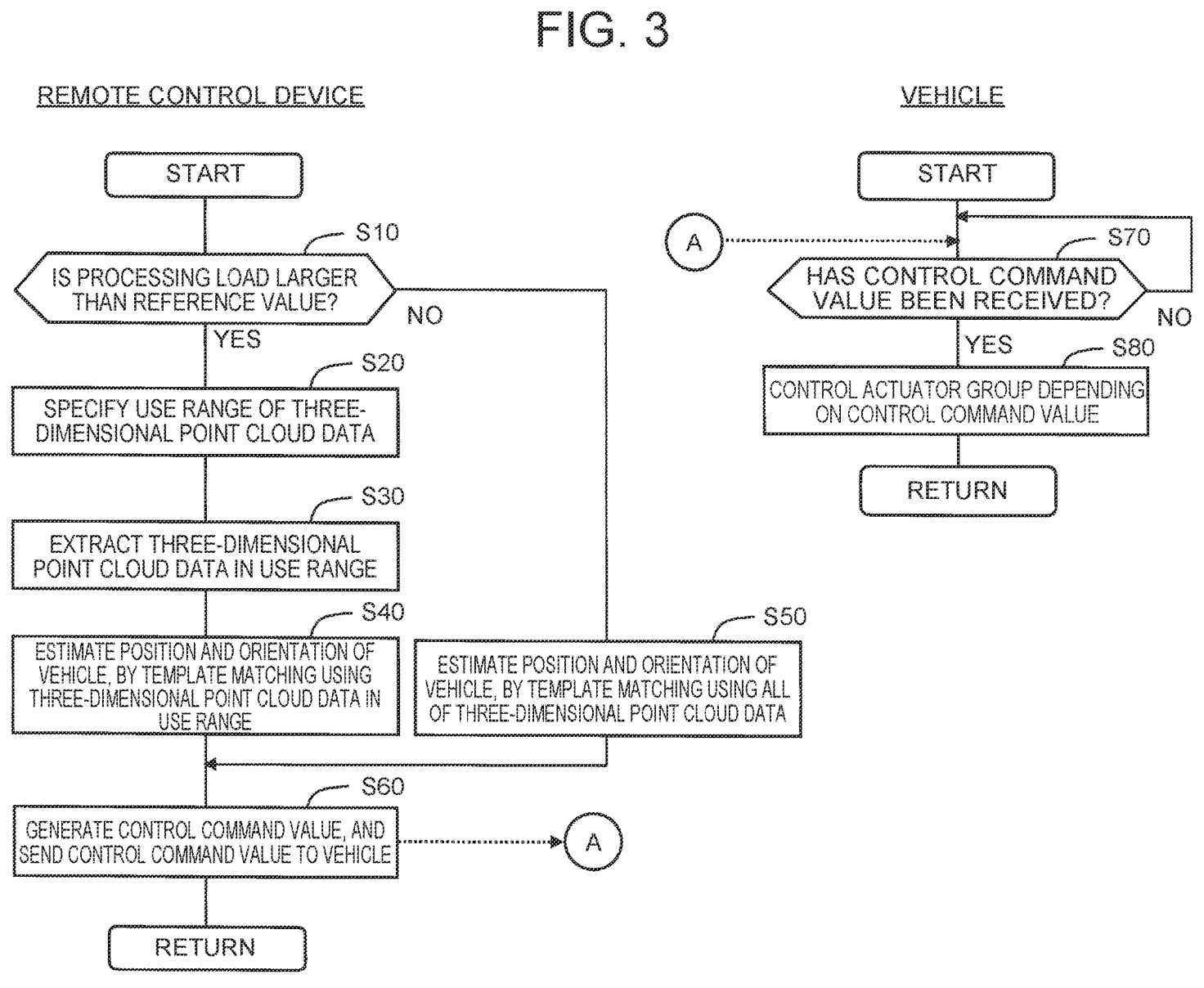

VEHICLE

START

S70
HAS CONTROL COMMAND VALUE BEEN RECEIVED?

NO

YES

S80
CONTROL ACTUATOR GROUP DEPENDING ON CONTROL COMMAND VALUE

RETURN (A)

REMOTE CONTROL DEVICE

START

S10
IS PROCESSING LOAD LARGER THAN REFERENCE VALUE?

NO

YES

S20
SPECIFY USE RANGE OF THREE-DIMENSIONAL POINT CLOUD DATA

S30
EXTRACT THREE-DIMENSIONAL POINT CLOUD DATA IN USE RANGE

S40
ESTIMATE POSITION AND ORIENTATION OF VEHICLE, BY TEMPLATE MATCHING USING THREE-DIMENSIONAL POINT CLOUD DATA IN USE RANGE

S50
ESTIMATE POSITION AND ORIENTATION OF VEHICLE, BY TEMPLATE MATCHING USING ALL OF THREE-DIMENSIONAL POINT CLOUD DATA

S60
GENERATE CONTROL COMMAND VALUE, AND SEND CONTROL COMMAND VALUE TO VEHICLE

RETURN (A)

FIG. 4
<PROCESSING LOAD IS EQUAL TO OR SMALLER THAN REFERENCE VALUE>
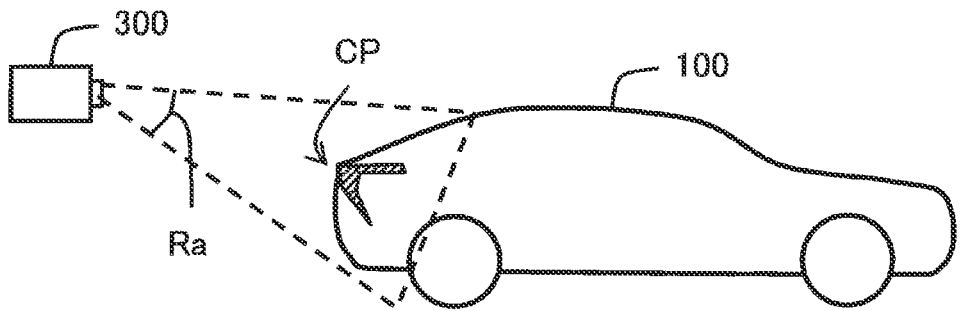
< PROCESSING LOAD IS LARGER THAN REFERENCE VALUE>
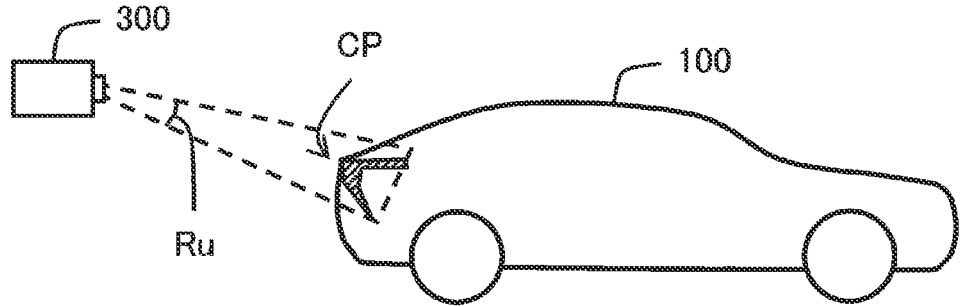

FIG. 6

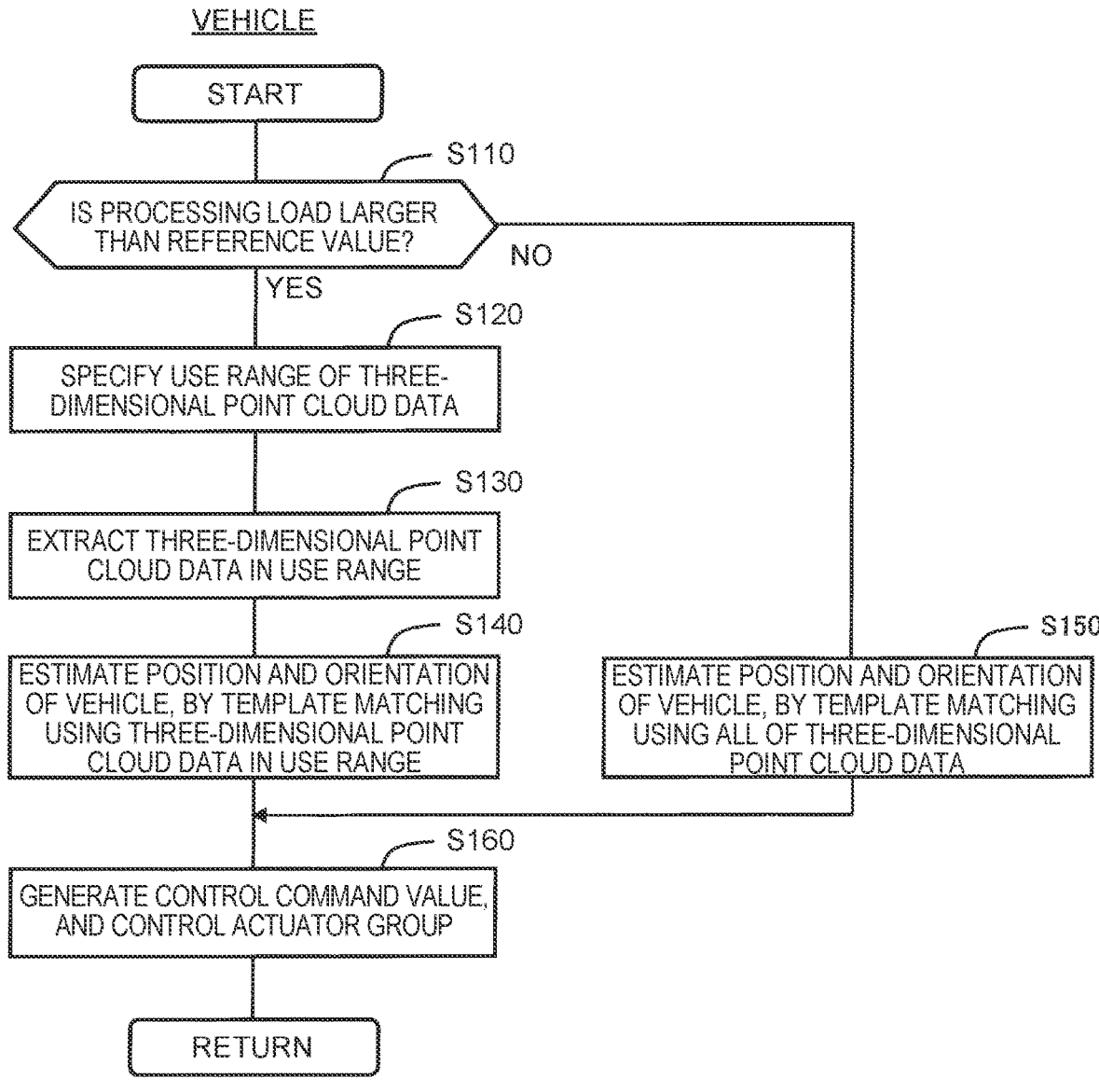

VEHICLE

START

S110
IS PROCESSING LOAD LARGER
THAN REFERENCE VALUE?                    NO

YES

S120
SPECIFY USE RANGE OF THREE-
DIMENSIONAL POINT CLOUD DATA

S130
EXTRACT THREE-DIMENSIONAL POINT
CLOUD DATA IN USE RANGE

S140
ESTIMATE POSITION AND ORIENTATION
OF VEHICLE, BY TEMPLATE MATCHING
USING THREE-DIMENSIONAL POINT
CLOUD DATA IN USE RANGE

S150
ESTIMATE POSITION AND ORIENTATION
OF VEHICLE, BY TEMPLATE MATCHING
USING ALL OF THREE-DIMENSIONAL
POINT CLOUD DATA

S160
GENERATE CONTROL COMMAND VALUE,
AND CONTROL ACTUATOR GROUP

RETURN

CONTROL DEVICE

CROSS-REFERENCE TO RELATED APPLICATION

This application claims priority to Japanese Patent Application No. 2023-089444 filed on May 31, 2023 and Japanese Patent Application No. 2023-185261 filed on Oct. 30, 2023, each incorporated herein by reference in its entirety.

BACKGROUND

1. Technical Field

The present disclosure relates to a control device of a movable body.

2. Description of Related Art

There is known a technology in which self-traveling conveyance of a vehicle is performed in the manufacturing process of the vehicle (Japanese Unexamined Patent Application Publication (Translation of PCT application) No. 2017-538619).

SUMMARY

When a movable body such as a vehicle is moved by self-traveling conveyance, a process of estimating the position and orientation of the movable body is executed. The position and orientation of the movable body can be estimated using three-dimensional point cloud data that is acquired using a distance measurement device such as a camera and a radar. In the estimation process, a short-cycle calculation is necessary for the stabilization of the traveling control for the movable body. However, a long processing time is required for processing a large amount of three-dimensional point cloud data, and therefore, there is a possibility that cycle delay occurs in the control of the movable body.

The present disclosure can be realized as the following modes.

A mode of the present disclosure provides a control device configured to generate a control command for controlling a movable body, using three-dimensional point cloud data about the movable body that is measured using a distance measurement device. The control device includes: a range specification unit configured to specify a use range that is a range including only some of the three-dimensional point cloud data; and an estimation unit configured to estimate at least one of the position and orientation of the movable body, using the three-dimensional point cloud data in the use range.

With this control device, at least one of the position and orientation of the movable body is estimated using only some of the three-dimensional point cloud data, and therefore it is possible to reduce the possibility that the cycle delay occurs in the control of the movable body.

In the above control device, the use range may be specified so as to include a characteristic portion in an observation region of the movable body, the observation region being a region where the movable body is observable by the distance measurement device, the characteristic portion being a portion where the density of a characteristic quantity is higher than an average value in the observation region.

With this control device, it is possible to set an appropriate use range.

In the above control device, the characteristic portion may be determined depending on the type of the movable body, the detection direction of the movable body by the distance measurement device, and the distance between the distance measurement device and the movable body.

With this control device, it is possible to accurately specify an effective use range for estimating at least one of the position and orientation of the movable body.

In the above control device, the range specification unit may be configured to execute a process of specifying the use range, when a processing load on the control device is larger than a previously set reference value, and may be configured to not execute the process of specifying the use range, when the processing load is equal to or smaller than the reference value.

With this control device, it is possible to reduce the possibility that the cycle delay occurs in the control of the movable body, when the processing load on the control device is large.

In the above control device, at least one of the detection direction of the movable body and the distance between the distance measurement device and the movable body may be determined using the three-dimensional point cloud data.

In the above control device, the estimation unit may be configured to perform matching of the three-dimensional point cloud data in the use range with template data, and to estimate at least one of the position and orientation of the movable body.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a flowchart showing a processing procedure of a remote control in the first embodiment;

FIG. 4 is an explanatory diagram showing a process of specifying a use range of three-dimensional point cloud data;

FIG. 6 is a flowchart showing a processing procedure of a vehicle control in the second embodiment.

DETAILED DESCRIPTION OF EMBODIMENTS

First Embodiment

Figure 1:
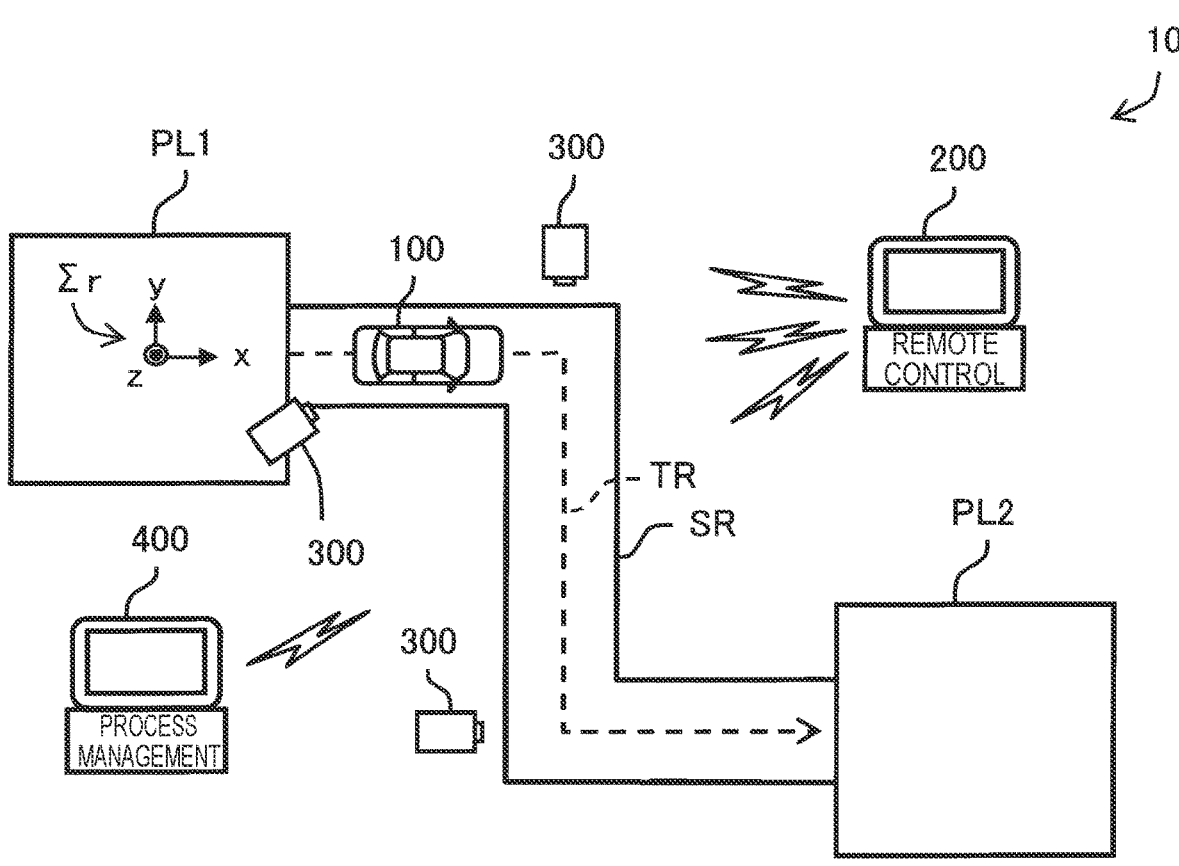
FIG. 1 is a conceptual diagram showing the configuration of a remote control system in an embodiment.

FIG. 1 is a conceptual diagram showing the configuration of a remote control system 10 in an embodiment. A remote control system 10 includes one or more vehicles 100 as movable bodies, a remote control device 200 that generates a control command for the remote control of each vehicle 100 and that sends the control command to the vehicle 100, a plurality of distance measurement devices 300 that measures three-dimensional point cloud data about the vehicle 100, and a process management device 400 that manages the manufacturing process of the vehicle 100. In the first embodiment, the remote control device 200 corresponds to the "control device" in the present disclosure.

It is preferable that the vehicle 100 be a battery electric vehicle (BEV). The movable body is not limited to the battery electric vehicle, and may be a gasoline vehicle, a hybrid electric vehicle, or a fuel cell electric vehicle, for example. The movable body is not limited to the vehicle 100, and may be an electric vertical takeoff and landing aircraft (a so-called flying vehicle), for example.

In the present disclosure, the "movable body" means a physical body that can move. The vehicle may be a vehicle that travels using wheels, or may be a vehicle that performs caterpillar traveling, and for example, is a passenger car, a track, a bus, a two-wheeled vehicle, a four-wheeled vehicle, a tank, a construction vehicle, or the like. In the case where the movable body is other than the vehicle, the expression "vehicle" and the expression "car" in the present disclosure can be replaced with "movable body" when appropriate, and the expression "traveling" can be replaced with "moving" when appropriate.

The vehicle 100 is configured to be capable of traveling by unmanned driving. The "unmanned driving" means a driving that does not depend on the traveling operation by an occupant. The traveling operation means an operation relevant to at least one of "running", "turning", and "stopping" of the vehicle 100. The unmanned driving is realized by an automatic or manual remote control that uses a device positioned in the exterior of the vehicle 100, or by an autonomous control of the vehicle 100. An occupant that does not perform the traveling operation may ride in the vehicle 100 that travels by unmanned driving. Examples of the occupant that does not perform the traveling operation include a person that merely sits on a seat of the vehicle 100, and a person that performs, in the vehicle 100, a work different from the traveling operation, as exemplified by attachment, inspection, or the operation of switches. The driving that depends on the traveling operation by the occupant is sometimes called "manned driving".

In the present specification, the "remote control" is a "full remote control" in which all of actions of the vehicle 100 are fully determined from the exterior of the vehicle 100, and a "partial remote control" in which some of the actions of the vehicle 100 are determined from the exterior of the vehicle 100. Further, the "autonomous control" includes a "full autonomous control" in which the vehicle 100 autonomously controls its action without receiving information from the device in the exterior of the vehicle 100 at all, and a "partial autonomous control" in which the vehicle 100 autonomously controls its action using information received from the device in the exterior of the vehicle 100.

In the embodiment, the remote control of the vehicle 100 is executed in a factory where the vehicle 100 is manufactured. The factory includes a first place PL1 and a second place PL2. The first place PL1 is a place where the assembly of the vehicle 100 is executed, for example, and the second place PL2 is a place where the inspection of the vehicle 100 is executed, for example. The first place PL1 and the second place PL2 are connected by a traveling road SR along which the vehicle 100 can travel. An arbitrary position in the factory is expressed as x, y and z coordinate values in a reference coordinate system Σr.

A plurality of distance measurement devices 300 that adopts the vehicle 100 as the measurement object is installed in the periphery of the traveling road SR. The remote control device 200 can acquire the position and orientation of the vehicle 100 relative to a target route TR, in real time, using three-dimensional point cloud data measured by each distance measurement device 300. As the distance measurement device 300, a camera and a light detection and ranging (LiDAR) can be used. Particularly, the LiDAR is preferable because highly-accurate three-dimensional point cloud data is obtained. Positions of the individual distance measurement devices 300 are fixed, and relative relations between the reference coordinate system Σr and device coordinate systems of the individual distance measurement devices 300 are previously known. Coordinate conversion matrixes for mutual conversion between coordinate values in the reference coordinate system Σr and coordinate values in the device coordinate systems of the individual distance measurement devices 300 are previously stored in the remote control device 200.

The remote control device 200 generates a control command for causing the vehicle 100 to travel along the target route TR, and sends the control command to the vehicle 100. The vehicle 100 travels in accordance with the received control command. Accordingly, in the remote control system 10, it is possible to move the vehicle 100 from the first place PL1 to the second place PL2, by remote control, without using a conveying device such as a crane or a conveyor.

Figure 2:
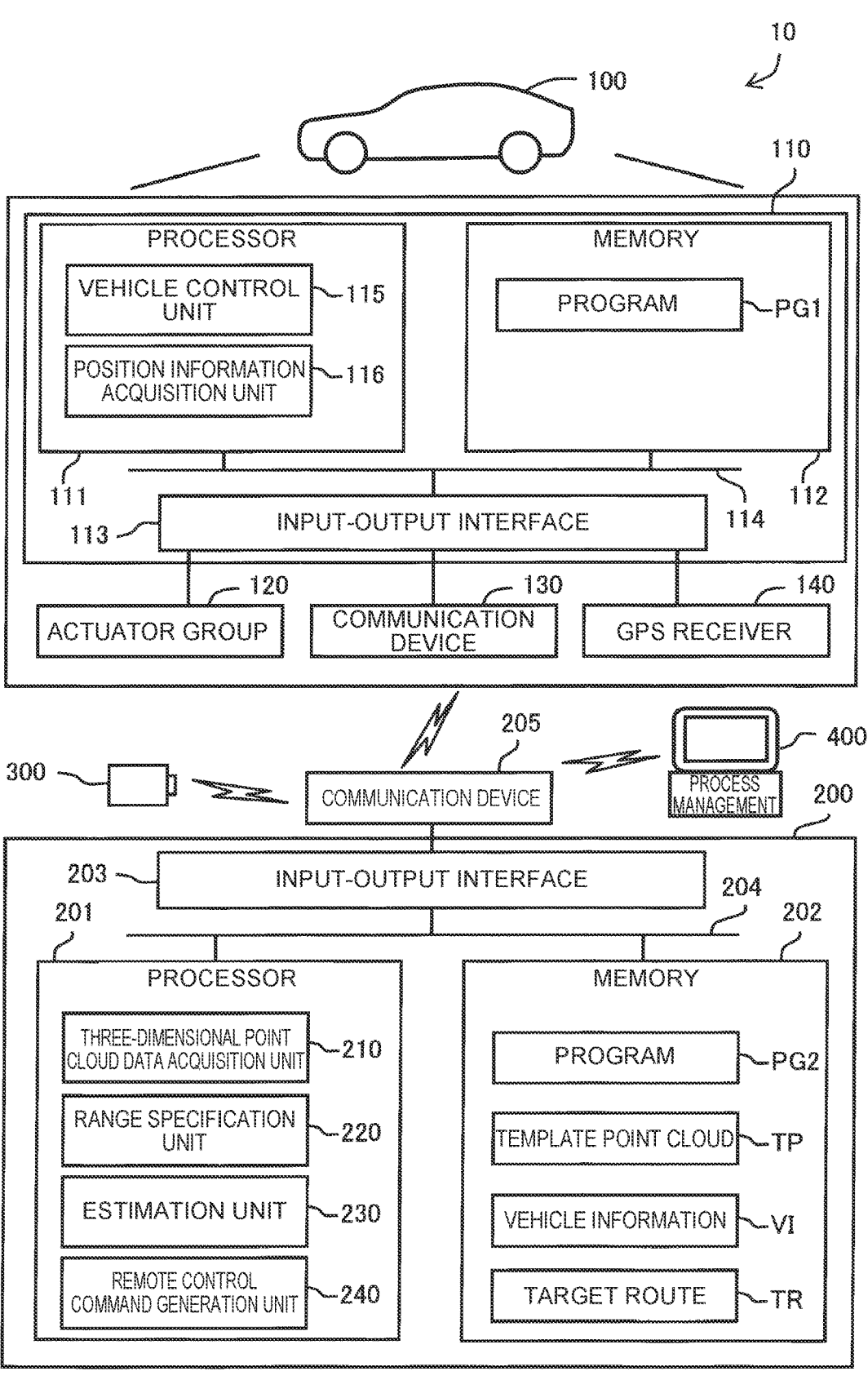
FIG. 2 is a block diagram showing the configuration of a vehicle and a remote control device in a first embodiment.

FIG. 2 is a block diagram showing the configuration of the vehicle 100 and the remote control device 200. The vehicle 100 includes a vehicle control device 110 for controlling parts of the vehicle 100, an actuator group 120 that is driven under the control by the vehicle control device 110, a communication device 130 for communicating with the remote control device 200 by wireless communication, and a GPS receiver 140 for acquiring position information about the vehicle 100. In the embodiment, the actuator group 120 includes an actuator of a driving device for accelerating the vehicle 100, an actuator of a steering device for changing the moving direction of the vehicle 100, and an actuator of a braking device for decelerating the vehicle 100. The driving device includes a battery, a traveling motor that is driven by the electric power of the battery, and driving wheels that are rotated by the traveling motor. The actuator of the driving device includes the traveling motor. The actuator group 120 may further include an actuator for swinging a windshield wiper of the vehicle 100, an actuator for opening and closing a power window of the vehicle 100, and the like.

The vehicle control device 110 is constituted by a computer including a processor 111, a memory 112, an input-output interface 113, and an internal bus 114. The processor 111, the memory 112, and the input-output interface 113 are connected through the internal bus 114, in a bi-directionally communicable manner. The input-output interface 113 is connected with the actuator group 120, the communication device 130, and the GPS receiver 140.

In the embodiment, the processor 111 functions as a vehicle control unit 115 and a position information acquisition unit 116, by executing a program PG1 that is previously stored in the memory 112. The vehicle control unit 115 controls the actuator group 120. When a driver rides in the vehicle 100, the vehicle control unit 115 can cause the vehicle 100 to travel, by controlling the actuator group 120 depending on the operation by the driver. In addition, regardless of whether the driver rides in the vehicle 100, the vehicle control unit 115 can cause the vehicle 100 to travel, by controlling the actuator group 120 depending on the control command that is sent from the remote control device 200. The position information acquisition unit 116 acquires the position information indicating the current place of the vehicle 100, using the GPS receiver 140. The position information acquisition unit 116 and the GPS receiver 140 may be excluded.

The remote control device 200 is constituted by a computer including a processor 201, a memory 202, an input-output interface 203, and an internal bus 204. The processor 201, the memory 202, and the input-output interface 203 are connected through the internal bus 204, in a bi-directionally communicable manner. The input-output interface 203 is connected with a communication device 205 for communicating with the vehicle 100, the distance measurement device 300, and the process management device 400, by wireless communication.

In the embodiment, the processor 201 functions as a three-dimensional point cloud data acquisition unit 210, a range specification unit 220, an estimation unit 230, and a remote control command generation unit 240, by executing a program PG2 that is previously stored in the memory 202.

The three-dimensional point cloud data acquisition unit 210 acquires the three-dimensional point cloud data measured by the distance measurement device 300. The three-dimensional point cloud data is data that indicates the three-dimensional position of a point cloud detected by the distance measurement device 300.

The range specification unit 220 specifies a use range that is a range including only some of the three-dimensional point cloud data. The method of the specification will be described later.

The estimation unit 230 estimates the position and orientation of the vehicle 100, using the three-dimensional point cloud data about the use range specified by the range specification unit 220. In the embodiment, the estimation unit 230 estimates the position and orientation of the vehicle 100, by executing template matching using a template point cloud TP stored in the memory 202. In the case where the three-dimensional point cloud data cannot be utilized, the estimation unit 230 can estimate the position and orientation of the vehicle 100, using a traveling history of the vehicle 100 and the position information detected by the GPS receiver 140 that is equipped in the vehicle 100. The estimation unit 230 may estimate only one of the position and orientation of the vehicle 100. In this case, the other of the position and orientation of the vehicle 100 is determined using the traveling history of the vehicle 100 or the like.

The information about the position and orientation of the vehicle is also referred to as "vehicle position information". In the embodiment, the vehicle position information includes the position and orientation of the vehicle 100 in the reference coordinate system of the factory.

The remote control command generation unit 240 generates the control command for the remote control, using the estimated position and orientation of the vehicle 100, and sends the control command to the vehicle 100. The control command is a command for causing the vehicle 100 to travel along the target route TR stored in the memory 202. The control command can be generated as a command including a driving or braking power and a turning angle. Alternatively, the control command may be generated as a command including at least one of the position and orientation of the vehicle 100 and a route along which the vehicle 100 will travel.

In the embodiment, the control command includes the acceleration and steering angle of the vehicle 100, as parameters. In another embodiment, the control command may include the velocity of the vehicle 100 as a parameter, instead of or in addition to the acceleration of the vehicle 100.

The process management device 400 manages the whole of the manufacturing process of the vehicle 100 in the factory. For example, when one vehicle 100 starts the traveling along the target route TR, individual information indicating the identification number, type, and others of the vehicle 100 is sent from the process management device 400 to the remote control device 200. The position of the vehicle 100 that is detected by the remote control device 200 is sent also to the process management device 400. The function of the process management device 400 may be implemented in the same device as the remote control device 200.

The remote control device 200 is also referred to as "server", and the distance measurement device 300 is also referred to as "external sensor". Further, the control command is also referred to as "traveling control signal", the target route TR is also referred to as "reference path", and the reference coordinate system is also referred to as "global coordinate system".

FIG. 3 is a flowchart showing a processing procedure of the remote control in the first embodiment. The processing by the remote control device 200 is executed in a constant cycle. Alternatively, the processing by the remote control device 200 that is shown in FIG. 3 may be executed whenever the three-dimensional point cloud data acquisition unit 210 newly acquires the three-dimensional point cloud data from the distance measurement device 300 that performs the measurement about the vehicle 100 as the control object. The three-dimensional point cloud data acquisition unit 210 may execute preprocessing of removing background point cloud data indicating a stationary object, from the newly acquired three-dimensional point cloud data.

In step S10, the range specification unit 220 determines whether the processing load on the remote control device 200 is larger than a reference value. For example, the processing load on the remote control device 200 is the usage rate of the processor 201. For the reference value of the processing load, a processing speed desired for stably performing the traveling control is determined in consideration of the velocity of the vehicle 100, and a value that allows the determined processing speed to be achieved is set. Alternatively, the reference value of the processing load may be a constant value that is previously set.

When the processing load is equal to or smaller than the reference value, the process proceeds to step S50. In step S50, the estimation unit 230 estimates the position and orientation of the vehicle 100, by executing matching between all of the three-dimensional point cloud data and the template point cloud TP. The phrase "all of the three-dimensional point cloud data" means the three-dimensional point cloud data before the use range is specified. As described above, the preprocessing of removing the background point cloud data may be performed to the three-dimensional point group data.

On the other hand, when the processing load is larger than the reference value, the process proceeds to step S20. In step S20, the range specification unit 220 specifies the use range that is a range including only some of the three-dimensional point cloud data.

FIG. 4 is an explanatory diagram showing the process of specifying the use range of the three-dimensional point cloud data. As shown at an upper portion in FIG. 4, when the processing load is equal to or smaller than the reference value, all range Ra of the three-dimensional point cloud data measured by the distance measurement device 300 is used with no change. On the other hand, as shown at a lower portion in FIG. 4, when the processing load is larger than the reference value, only the three-dimensional point cloud data in a use range Ru that is smaller than the all range Ra of the three-dimensional point cloud data measured by the distance measurement device 300 is used. The use range Ru is a range that is narrower than the all range Ra of the visual field of the distance measurement device 300. The number of points of the point cloud that is detected in the use range Ru is smaller than the number of points of the point cloud that is detected in the all range Ra. The reason why the use range Ru is caused to be narrower than the all range Ra is because the use of only some of the three-dimensional point cloud data makes it possible to increase the speed of the estimation of the position and orientation of the vehicle 100, and to reduce the possibility that the cycle delay in the remote control occurs.

It is preferable that the use range Ru be specified so as to include a characteristic portion CP in an observation region of the vehicle 100. The observation region is a region where the vehicle 100 can be observed by the distance measurement device 300. The characteristic portion CP is a portion where the density of a characteristic quantity is higher than the average value in the observation region. In the example of FIG. 4, a prominent portion on a back surface of the vehicle 100 is shown as the characteristic portion CP. The characteristic quantity is an edge quantity, for example, and is the quantity of characteristic points that are extracted by applying a characteristic point extraction operator to an image of the vehicle 100. For example, the observation region of the vehicle 100 is the region of all the back surface of the vehicle 100. When the use range Ru is specified so as to include the characteristic portion CP with large characteristic quantity in this way, it is possible to use a point cloud suitable for the estimation of the position and orientation of the vehicle 100.

For example, the range of the characteristic portion CP for specifying the use range Ru can be determined by one of the following methods.

Determination Method M1 for Characteristic Portion CP

The characteristic portion CP is determined depending on the type of the vehicle 100, the detection direction of the vehicle 100 by the distance measurement device 300, and the distance between the distance measurement device 300 and the vehicle 100.

The type of the vehicle 100 can be determined based on the individual information that is sent from the process management device 400 to the remote control device 200. Alternatively, the type of the vehicle 100 may be acquired by the remote control device 200, through the wireless communication with the vehicle 100. The type of the vehicle 100 only needs to be information indicating the external shape of the vehicle 100, and may be a company-specific reference number. The detection direction of the vehicle 100 by the distance measurement device 300 can be determined based on the position of a closely-spaced portion of the point cloud in the three-dimensional point cloud data. For example, a bounding box that encloses the closely-spaced portion of the point cloud may be determined, and the direction from the distance measurement device 300 to a reference position of the bounding box may be determined as the "detection direction". For example, the distance between the distance measurement device 300 and the vehicle 100 can be determined as the distance from the distance measurement device 300 to the reference position of the bounding box. The shape and position of the characteristic portion CP are decided depending on the type of the vehicle, and the position relation between the bounding box for the point cloud and the characteristic portion CP is decided depending on the type of the vehicle. Therefore, the information about the shape and position of the characteristic portion CP and the information about the position relation between the bounding box for the point cloud and the characteristic portion CP are stored for each type, as vehicle information VI. Accordingly, the position and shape of the characteristic portion CP can be determined based on the type of the vehicle 100, the detection direction of the vehicle 100 by the distance measurement device 300, and the distance between the distance measurement device 300 and the vehicle 100.

Determination Method M2 for Characteristic Portion CP

The characteristic portion CP is determined depending on the density of the point cloud in the three-dimensional point cloud data.

At a portion in the three-dimensional point cloud data where the density of the point cloud is high, the characteristic quantity is also large, and therefore the portion where the density of the point cloud is high can be determined as the characteristic portion CP. For example, a bounding box that encloses a closely-spaced portion of the point cloud is determined, the bounding box is divided into a plurality of voxels (minute boxes), and the density of the point cloud is calculated for each voxel. A portion where voxels in each of which the density of the point cloud is equal to or larger than a predetermined reference value exist in a concentrative manner can be determined as the characteristic portion CP.

The use range Ru is set as a range including the characteristic portion CP. In the example of FIG. 4, the use range Ru is set as a range that is wider than the range of the circumscription of the characteristic portion CP. Thereby, the use range Ru can be set so as to surely include the characteristic portion CP, even when the accuracy of the process for determining the position and shape of the characteristic portion CP is low.

In step S30, the estimation unit 230 extracts the three-dimensional point cloud data in the use range Ru. In step S40, the estimation unit 230 estimates the position and orientation of the vehicle 100, by executing matching between the three-dimensional point cloud data in the use range Ru and the template point cloud TP.

In step S60, the remote control command generation unit 240 generates a control command value, using the position and orientation of the vehicle 100 that are estimated in step S40 or step S50, and sends the control command value to the vehicle 100. Details of step S60 will be described below.

In step S60, first, the remote control command generation unit 240 determines a target position to which the vehicle 100 will go from now, using the vehicle position information including the position and orientation of the vehicle 100 and the target route TR. The remote control command generation unit 240 determines the target position on the target route TR ahead of the current place of the vehicle 100, and generates the control command value for causing the vehicle 100 to travel toward the target position. In the embodiment, the control command value includes the acceleration and steering angle of the vehicle 100, as parameters. The remote control command generation unit 240 calculates the traveling velocity of the vehicle 100, from the transition of the position of the vehicle 100, and compares the calculated traveling velocity and a target velocity. As a whole, the remote control command generation unit 240 determines the acceleration such that the vehicle 100 is accelerated, when the traveling velocity is lower than the target velocity, and determines the acceleration such that the vehicle 100 is decelerated, when the traveling velocity is higher than the target velocity. Further, when the vehicle 100 is positioned on the target route TR, the remote control command generation unit 240 determines the steering angle and the acceleration such that the vehicle 100 does not depart from the target route TR. When the vehicle 100 is not positioned on the target route TR, in other words, when the vehicle 100 has departed from the target route TR, the remote control command generation unit 240 determines the steering angle and the acceleration such that the vehicle 100 returns to the target route TR. In another embodiment, the control command value may include the velocity of the vehicle 100 as a parameter, instead of or in addition to the acceleration of the vehicle 100. The control command value generated in this way is sent from the remote control device 200 to the vehicle 100.

The control process by the processor 111 of the vehicle 100 includes step S70 and step S80. In step S70, the vehicle control unit 115 waits until the control command value is acquired from the remote control device 200. When the control command value is acquired, the process proceeds to step S80, and the vehicle control unit 115 controls the actuator group 120 depending on the acquired control command value. In the remote control system 10 in the embodiment, it is possible to cause the vehicle 100 to travel by remote control, and to move the vehicle 100 along the target route TR without using conveying equipment such as a crane or a conveyor.

In the above-described processing procedure in FIG. 3, the use range Ru of the three-dimensional point cloud data is restricted only when the processing load on the remote control device 200 is large, but the use range Ru may be always restricted regardless of the processing load. In this case, step S10 and step S50 are skipped.

As described above, in the first embodiment, the use range Ru that is a range including only some of the three-dimensional point cloud data is specified, and at least one of the position and orientation of the movable body is estimated using the three-dimensional point cloud data in the use range Ru. Therefore, it is possible to reduce the possibility that the cycle delay in the remote control occurs.

In the above embodiment, the vehicle 100 only needs to have a configuration in which the vehicle 100 can move by remote control, and for example, may have a platform including a configuration described below. Specifically, the vehicle 100 only needs to include at least the vehicle control unit 115 and the communication device 150, for exerting the three functions of "running", "turning", and "stopping" by remote control. That is, the vehicle 100 that can move by remote control does not need to be provided with a driver's seat and at least some of interior components such as a dashboard, does not need to be provided with at least some of exterior components such as a bumper and a fender, and does not need to be provided with a bodyshell. In this case, the other components such as the bodyshell may be attached to the vehicle 100 before the vehicle 100 is shipped from the factory, or the other components such as the bodyshell may be attached to the vehicle 100 after the vehicle 100 is shipped from the factory in a state where the other components such as the bodyshell have not been attached to the vehicle 100. Also in the case of the platform, the position determination can be performed similarly to the vehicle 100 in the embodiments.

Second Embodiment

Figure 5:
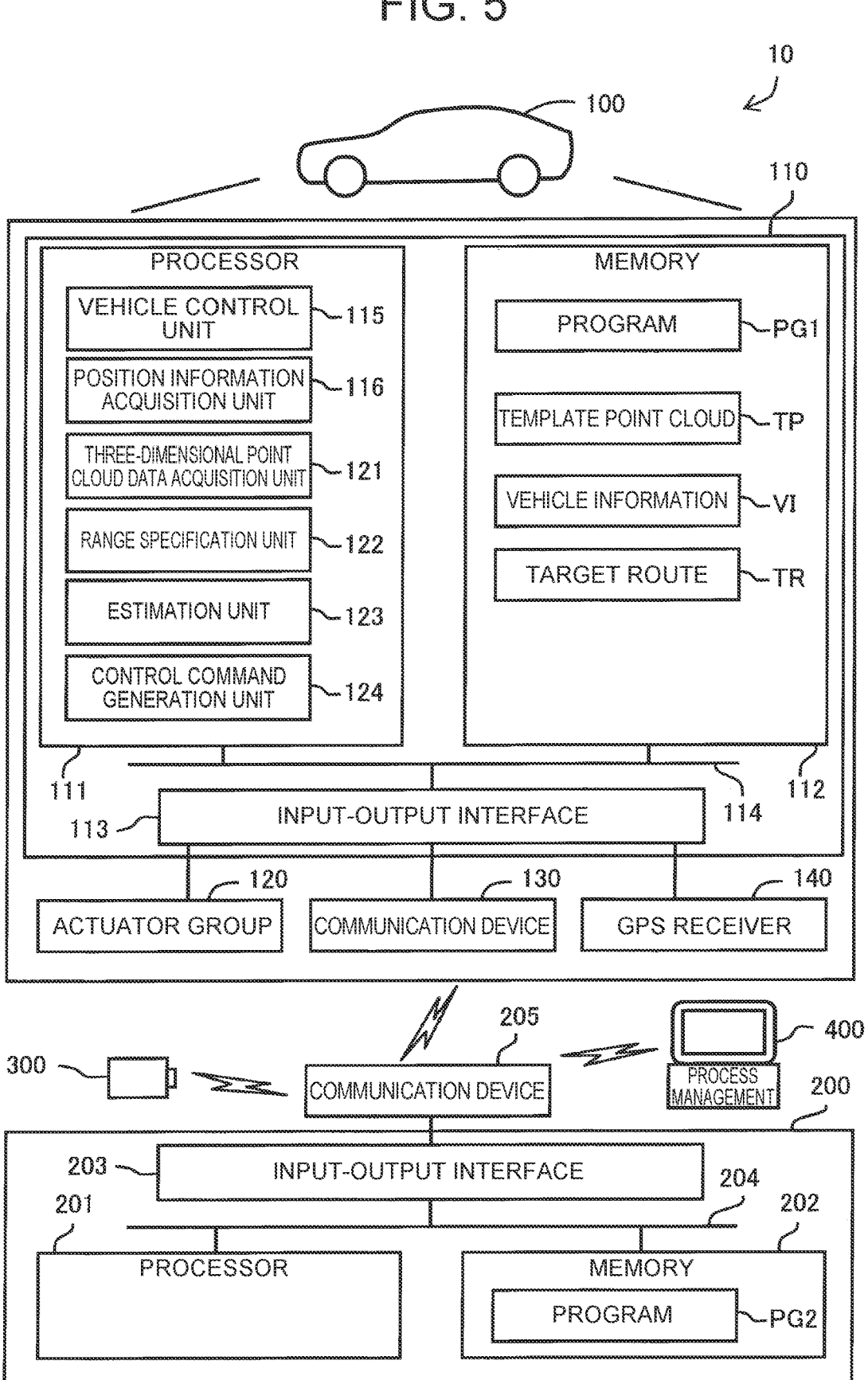
FIG. 5 is a block diagram showing the configuration of a vehicle and a remote control device in a second embodiment.

FIG. 5 is a block diagram showing the configuration of a vehicle 100 and a remote control device 200 in a second embodiment. Differences from the configuration shown in FIG. 2 in the first embodiment are mainly the following three points.

Functions of a three-dimensional point cloud data acquisition unit 121, a range specification unit 122, an estimation unit 123, and a control command generation unit 124 are added to the function of the processor 111 of the vehicle 100.

The template point cloud TP, the vehicle information VI, and the target route TR are stored in the memory 112 of the vehicle 100.

Functions of the three-dimensional point cloud data acquisition unit 210, the range specification unit 220, the estimation unit 230, and the remote control command generation unit 240 are excluded from the function of the processor 201 of the remote control device 200.

The functions of the three-dimensional point cloud data acquisition unit 121, the range specification unit 122, the estimation unit 123, and the control command generation unit 124 are almost the same as the functions of the three-dimensional point cloud data acquisition unit 210, the range specification unit 220, the estimation unit 230, and the remote control command generation unit 240, respectively, and therefore the description thereof is omitted.

In the second embodiment, the process of specifying the use range Ru that is a range including only some of the three-dimensional point cloud data and estimating at least one of the position and orientation of the vehicle 100 using the three-dimensional point cloud data in the use range Ru is executed by the vehicle 100. That is, in the second embodiment, the vehicle control device 110 of the vehicle 100 corresponds to the "control device" in the present disclosure.

FIG. 6 is a flowchart showing a processing procedure of a vehicle control in the second embodiment. Steps S110 to S160 in FIG. 6 correspond to steps S10 to S60 shown in FIG. 3 in the first embodiment, respectively. In step S160, the control command value is created by the control command generation unit 124 of the vehicle 100, and therefore the control of the actuator group 120 of the vehicle 100 is executed without the sending and receiving of the control command value between the remote control device 200 and the vehicle 100.

The template point cloud TP, the vehicle information VI, and the target route TR are stored in the memory 112 of the vehicle 100, before the vehicle 100 starts the traveling along the target route TR. The template point cloud TP, the vehicle information VI, and the target route TR may be supplied from the remote control device 200 or the process management device 400, or may be written in the memory 112 of the vehicle 100 using other means.

As described above, in the second embodiment, similarly to the first embodiment, the use range Ru that is a range including only some of the three-dimensional point cloud data is specified, and at least one of the position and orientation of the movable body is estimated using the three-dimensional point cloud data in the use range Ru. Therefore, it is possible to reduce the possibility that the cycle delay occurs in the control of the vehicle.

Other Embodiments

In embodiments described below, "server 200" means the remote control device 200, and "external sensor" means the distance measurement device 300. Further, "traveling control signal" means the control command, "reference path" means the target route TR, and "global coordinate system" means the reference coordinate system $\Sigma r$.

11 12

In the above embodiments, the external sensor is a light detection and ranging (LiDAR). However, the external sensor does not need to be a LiDAR, and may be a camera, for example. In the case where the external sensor is a camera, the server 200 acquires the position of the vehicle 100, for example, by detecting the external form of the vehicle 100 from a pickup image, calculating the coordinates of a position measurement point of the vehicle 100 in a coordinate system for the pickup image, that is, in a local coordinate system, and converting the calculated coordinates into coordinates in the global coordinate system. For example, the external form of the vehicle 100 included in the pickup image can be detected by inputting the pickup image to a detection model for which an artificial model is used. For example, the detection model is prepared in the interior of the system 10 or in the exterior of the system 10, and is previously stored in the memory of the server 200. Examples of the detection model include a machine learning model for which training and learning have been performed such that one of semantic segmentation and instance segmentation is realized. As the machine learning model, for example, a convolutional neural network (referred to as a CNN, hereinafter) for which training has been performed by a supervised learning using a learning data set can be used. For example, the learning data set includes a plurality of training images that includes the vehicle 100, and labels that indicate whether each region in the training image is a region for the vehicle 100 or a region other than the vehicle 100. At the time of the learning for the CNN, it is preferable to update parameters in the CNN so as to reduce the error between the output result by the detection model and the label, by a back propagation method. For example, the server 200 can acquire the orientation of the vehicle 100, by performing the estimation based on the orientation of the mobile vector of the vehicle 100 that is calculated from the position change in the characteristic point of the vehicle 100 among frames of the pickup image, using an optical flow method.

In the above first embodiment, the processing from the acquisition of the vehicle position information including the position and orientation of the vehicle 100 to the generation of the traveling control signal is executed by the server 200. However, at least a part of the processing from the acquisition of the vehicle position information to the generation of the traveling control signal may be executed by the vehicle 100. For example, the following modes (1) to (3) may be adopted.

(1) The server 200 may acquire the vehicle position information, may determine the target position to which the vehicle 100 will go from now, and may generate a path from the current place of the vehicle 100 that is shown in the acquired vehicle position information to the target position. The server 200 may generate a path to a target position between the current place and a destination, or may generate a path to the destination. The server 200 may send the generated path to the vehicle 100. The vehicle 100 may generate the traveling control signal such that the vehicle 100 travels on the path received from the server 200, and may control the actuator of the vehicle 100 using the generated traveling control signal.

(2) The server 200 may acquire the vehicle position information, and may send the acquired vehicle position information to the vehicle 100. The vehicle 100 may determine the target position to which the vehicle 100 will go from now, may generate the path from the current place of the vehicle 100 that is shown in the received vehicle position information to the target position, may generate the traveling control signal such that the vehicle 100 travels on the generated path, and may control the actuator of the vehicle 100 using the generated traveling control signal.

(3) In the above modes (1) and (2), an internal sensor may be equipped in the vehicle 100, and the detection result output from the internal sensor may be used for at least one of the generation of the path and the generation of the traveling control signal. The internal sensor is a sensor that is equipped in the vehicle 100. Specifically, for example, the internal sensor can include a camera, a LiDAR, a millimeter-wave radar, an ultrasonic sensor, a GPS sensor, an acceleration sensor, a gyroscope sensor, and the like. For example, in the above mode (1), the server 200 may acquire the detection result of the internal sensor, and may reflect the detection result of the internal sensor in the path at the time of the generation of the path. In the above mode (1), the vehicle 100 may acquire the detection result of the internal sensor, and may reflect the detection result of the internal sensor in the traveling control signal at the time of the generation of the traveling control signal. In the above mode (2), the vehicle 100 may acquire the detection result of the internal sensor, and may reflect the detection result of the internal sensor in the path at the time of the generation of the path. In the above mode (2), the vehicle 100 may acquire the detection result of the internal sensor, and may reflect the detection result of the internal sensor in the traveling control signal at the time of the generation of the traveling control signal.

In the above embodiments, the internal sensor may be equipped in the vehicle 100, and the detection result output from the internal sensor may be used for at least one of the generation of the path and the generation of the traveling control signal. For example, the vehicle 100 may acquire the detection result of the internal sensor, and may reflect the detection result of the internal sensor in the path at the time of the generation of the path. The vehicle 100 may acquire the detection result of the internal sensor, and may reflect the detection result of the internal sensor in the traveling control signal at the time of the generation of the traveling control signal.

In the first embodiment, the server 200 automatically generates the traveling control signal that is sent to the vehicle 100. However, the server 200 may generate the traveling control signal that is sent to the vehicle 100, in accordance with the operation by an external operator in the exterior of the vehicle 100. For example, the external operator may operate a maneuvering device including a display device that displays the pickup image output from the external sensor, a steering wheel, accelerator pedal and brake pedal for remotely operating the vehicle 100, and a communication device for communicating with the server 200 by wired communication or wireless communication, and the server 200 may generate the traveling control signal depending on the operation to the maneuvering device.

In the above embodiments, the vehicle 100 only needs to have a configuration in which the vehicle 100 can move by unmanned driving, and for example, may have a platform that has a configuration described below. Specifically, the vehicle 100 only needs to include at least a control device that controls the traveling of the vehicle 100 and the actuator of the vehicle 100, for exerting the three functions of "running", "turning", and "stopping" by unmanned driving. In the case where the vehicle 100 acquires information from the exterior for unmanned driving, the vehicle 100 only needs to further include the communication device. That is, the vehicle 100 that can move by unmanned driving does not need to be provided with a driver's seat and at least some of interior components such as a dashboard, does not need to be provided with at least some of exterior components such as a bumper and a fender, and does not need to be provided with a bodyshell. In this case, the other components such as the bodyshell may be attached to the vehicle 100 before the vehicle 100 is shipped from the factory, or the other components such as the bodyshell may be attached to the vehicle 100 after the vehicle 100 is shipped from the factory in a state where the other components such as the bodyshell have not been attached to the vehicle 100. Components may be attached from arbitrary directions such as the upper side, lower side, front side, rear side, right side and left side of the vehicle 100, and may be attached from the same direction as each other, or may be attached from different directions from each other. Also in the case of the platform, the position determination can be performed similarly to the vehicle 100 in the first embodiment.

The vehicle 100 may be manufactured by combining a plurality of modules. The module means a unit constituted by a plurality of components that is collected depending on a site or function of the vehicle 100. For example, the platform of the vehicle 100 may be manufactured by combining a front module configuring a front portion of the platform, a central module configuring a central portion of the platform, and a rear module configuring a rear portion of the platform. The number of modules that constitute the platform is not limited to three, and may be two or less or may be four or more. Further, components constituting a portion of the vehicle 100 that is different from the platform may be modularized in addition to or instead of components constituting the platform. Further, each module may include arbitrary exterior components such as bumper and a grill, and arbitrary interior components such as a seat and a console. Further, without being limited to the vehicle 100, an arbitrary kind of movable body may be manufactured by combining a plurality of modules. For example, such a module may be manufactured by joining a plurality of components by welding, a fixture or the like, or may be manufactured by integrally molding at least some of components constituting the module, as one component, by casting. The molding technique of integrally molding one component, particularly a relatively large component is also called giga cast or mega cast. For example, the above front module, the above central module, and the above rear module may be manufactured by the giga cast.

The conveyance of the vehicle 100 using the traveling of the vehicle 100 by unmanned driving is also called "self-traveling conveyance". Further, the configuration for realizing the self-traveling conveyance is also called "vehicle remote-control autonomous-traveling conveyance system". Further, the production method of producing the vehicle 100 using the self-traveling conveyance is also called "self-traveling production". In the self-traveling production, at least a part of the conveyance of the vehicle 100 is realized by self-traveling conveyance, in a factory where the vehicle 100 is manufactured, for example.

The present disclosure is not limited to the above-described embodiments, and can be realized as various configurations without departing from the spirit of the present disclosure. For example, technical characteristics in the embodiments that correspond to technical characteristics in the modes described in SUMMARY can be replaced or combined when appropriate, for solving some or all of the above-described problems or for achieving some or all of the above-described effects. Further, the technical characteristics can be removed when appropriate, except technical characteristics that are described to be essential in the present specification.

What is claimed is:

1. A control device configured to generate a control command for controlling a movable body, using three-dimensional point cloud data about the movable body that is measured using a distance measurement device, the control device comprising:
   a communication interface configured to communicate with the distance measurement device and the movable body; and
   a processor programmed to:
      specify a use range that is a range including only some of the three-dimensional point cloud data, the use range being specified so as to include a characteristic portion in an observation region of the movable body, the observation region being a region where the movable body is observable by the distance measurement device, the characteristic portion being a portion where a density of a characteristic quantity is higher than an average value in the observation region; and
      estimate at least one of a position and orientation of the movable body, using the three-dimensional point cloud data in the specified use range.

2. The control device according to claim 1, wherein the characteristic portion is determined depending on a type of the movable body, a detection direction of the movable body by the distance measurement device, and a distance between the distance measurement device and the movable body.

3. The control device according to claim 2, wherein at least one of the detection direction of the movable body and the distance between the distance measurement device and the movable body is determined using the three-dimensional point cloud data.

4. The control device according to claim 1, wherein the processor is programmed to perform matching of the three-dimensional point cloud data in the use range with template data, and to estimate at least one of the position and orientation of the movable body.

5. A control device configured to generate a control command for controlling a movable body, using three-dimensional point cloud data about the movable body that is measured using a distance measurement device, the control device comprising:
   a communication interface configured to communicate with the distance measurement device and the movable body; and
   a processor programmed to:
      specify a use range that is a range including only some of the three-dimensional point cloud data; and
      estimate at least one of a position and orientation of the movable body, using the three-dimensional point cloud data in the specified use range,
   wherein the use range is specified when a processing load on the control device is larger than a previously set reference value, and is not specified when the processing load is equal to or smaller than the reference value.

* * * * *